(12) United States Patent
Schober et al.

(10) Patent No.: US 11,196,608 B2
(45) Date of Patent: Dec. 7, 2021

(54) APPARATUS AND METHOD FOR REUSING EXISTING CONSTELLATION FOR SUPERPOSED TRANSMISSION

(71) Applicant: Nokia Technologies Oy, Espoo (FI)

(72) Inventors: Karol Schober, Helsinki (FI); Mihai Enescu, Espoo (FI); Mikko Tapio Kokkonen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 164 days.

(21) Appl. No.: 15/740,517

(22) PCT Filed: Jun. 28, 2016

(86) PCT No.: PCT/IB2016/053854
§ 371 (c)(1),
(2) Date: Dec. 28, 2017

(87) PCT Pub. No.: WO2017/002013
PCT Pub. Date: Jan. 5, 2017

(65) Prior Publication Data
US 2018/0191549 A1 Jul. 5, 2018

Related U.S. Application Data

(60) Provisional application No. 62/187,891, filed on Jul. 2, 2015.

(51) Int. Cl.
*H04L 27/34* (2006.01)
*H04L 27/26* (2006.01)
(Continued)

(52) U.S. Cl.
CPC ........ *H04L 27/3488* (2013.01); *H04L 1/0675* (2013.01); *H04L 5/003* (2013.01);
(Continued)

(58) Field of Classification Search
CPC ... H04L 1/0003; H04L 1/0009; H04L 5/0055; H04L 5/0057; H04L 1/1861;
(Continued)

(56) References Cited

U.S. PATENT DOCUMENTS 8,290,077 B1 * 10/2012 Ben-Eli ............... H04L 27/3488
370/335
2005/0041618 A1 * 2/2005 Wei ........................ H04B 7/264
370/328
(Continued)

FOREIGN PATENT DOCUMENTS

CN 102045293 A 5/2011
CN 104640220 A 5/2015
(Continued)

OTHER PUBLICATIONS

Notice of Preliminary Rejection issued in corresponding Korean Patent Application No. 2018-7003245, dated Jun. 28, 2019.
(Continued)

*Primary Examiner* — David C Payne
*Assistant Examiner* — Sarah Hassan
(74) *Attorney, Agent, or Firm* — Squire Patton Boggs (US) LLP (57) ABSTRACT

One embodiment is directed to a method comprising deciding to multiplex the data of at least two users within a super-constellation; determining the power split ratio among the at least two users; selecting a super-constellation; and based on the determined power split ratio, choosing a subset of the super-constellation points forming the superposition of modulation constellations of the at least two users.

18 Claims, 7 Drawing Sheets

(51) Int. Cl.
*H04L 5/00* (2006.01)
*H04L 27/18* (2006.01)
*H04L 5/04* (2006.01)
*H04L 1/06* (2006.01)

(52) U.S. Cl.
CPC .............. *H04L 5/04* (2013.01); *H04L 27/183* (2013.01); *H04L 27/2604* (2013.01); *H04L 27/3416* (2013.01); *H04L 27/3477* (2013.01); *H04L 5/0023* (2013.01)

(58) Field of Classification Search
CPC ... H04L 1/0006; H04L 1/0041; H04L 1/0675; H04L 1/1816; H04L 1/0033; H04L 1/0051
USPC .......................................... 375/260; 370/312
See application file for complete search history.

(56) References Cited

U.S. PATENT DOCUMENTS

| | | | | |
|---|---|---|---|---|
| 2008/0253389 | A1* | 10/2008 | Larsson | H04L 1/0003 370/441 |
| 2011/0222462 | A1 | 9/2011 | Ho et al. | |
| 2015/0208366 | A1* | 7/2015 | Papasakellariou | H04W 52/244 370/311 |
| 2015/0282176 | A1* | 10/2015 | MacLeod | H04L 1/0003 370/329 |
| 2016/0065401 | A1* | 3/2016 | Jia | H04L 5/02 375/298 |
| 2016/0366003 | A1* | 12/2016 | Kwon | H04W 72/0473 |
| 2018/0069651 | A1* | 3/2018 | Davydov | H04L 1/0003 |

FOREIGN PATENT DOCUMENTS

| | | |
|---|---|---|
| CN | 104754719 A | 7/2015 |
| WO | 2014/208140 A1 | 12/2014 |
| WO | 2014/208158 A1 | 12/2014 |

OTHER PUBLICATIONS

Chinese Office Action corresponding to CN Application No. 201680047346.4 dated Aug. 11, 2020.
Indonesian Substantive Examination Report Stage I, corresponding to ID Appln. No. PID201800801, dated Oct. 30, 2019.
Extended European Search Report for corresponding Application No. 16817345.8, dated Mar. 14, 2019.
Nokia Networks: "Discussion on the DL superposed transmission schemes", 3GPP TSG-RAN WG1 Meeting #81, Fukuoka, Japan, May 24-29, 2019, R1-153262, pp. 1-4.
Qualcomm Incorporated: "Multiuser superposition schemes", 3GPP TSG RAN WG1 #80bis, Belgrade, Serbia, Apr. 20-24, 2015, R1-151425, pp. 1-4.
Huawei et al.: "Candidate schemes for superposition transmission", 3GPP TSG RAN WG1#80b, Belgrade, Serbia, Apr. 20-24, 2015, R1-151848, pp. 1-11.
International Search Report and Written Opinion received for corresponding Patent Cooperation Treaty Application No. PCT/IB2016/053854, dated Sep. 12, 2016, 13 pages.
ZTE, "Enhanced superposition schemes for MUST", 3GPP TSG-RAN WG1 #80bis, R1-151722, Belgrade, Serbia, Apr. 20-24, 2015, 3 pages.
ZTE, "Potential transmission schemes for MUST", 3GPP TSG RAN WG1 Meeting #81, R1-152974, Fukuoka, Japan, May 25-29, 2015, 5 pages.
Sharp, "Constellation mapping enhancements for downlink multiuser superposition transmission", 3GPP TSG RAN WG1 Meeting #81, R1-153058, Fukuoka, Japan, May 25-29, 2015, 5 pages.
Nokia Networks, "Discussion on the DL superposed transmissions schemes", 3GPP TSG-RAN WG1 Meeting #82, R1-154656, Beijing, China, Aug. 24-28, 2015, 5 pages.
Korean Notice of Preliminary Rejection corresponding to KR Appln. No. 10-2018-7003245, dated Dec. 30, 2019.
Notification of the First Office Action dated Mar. 23, 2020 corresponding to Chinese Patent Application No. 2016800473464, and English translation thereof.

* cited by examiner

APPARATUS AND METHOD FOR REUSING EXISTING CONSTELLATION FOR SUPERPOSED TRANSMISSION

CROSS-REFERENCE TO RELATED APPLICATIONS

This application is related to and claims the benefit and priority of U.S. Provisional Patent Application No. 62/187,891, filed Jul. 2, 2015. The entirety of the prior application is hereby incorporated herein by reference in its entirety.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application.

Long term evolution (LTE) advanced offers higher data rates and improved cell capacity than prior releases. Multi-user multiple input multiple output (MIMO) is one technique achieving that by multiplexing users in the spatial domain. Traditionally, in legacy LTE releases, this is done by utilizing orthogonal beams for the multiplexed users. Another principle for spatial multiplexing of users is based on non-orthogonal multiple access (NOMA)/multi-user-superposed-transmission (MUST). In this situation the users having the same or similar beam/precoder are multiplexed in power/symbol domain on the same time/frequency resource. The main NOMA capacity gain comes from pairing UEs with signal to interference and noise ratio (SINR) imbalance, which most likely ends up with pairing far and near user equipments (UEs) with respect to their distance to evolved Node B (eNB).

SUMMARY

According to a first embodiment, a method can include deciding to multiplex the data of at least two users within a super-constellation; determining the power split ratio among the at least two users; selecting a super-constellation; and based on the determined power split ratio, choosing a subset of the super-constellation points forming the superposition of modulation constellations of the at least two users.

According to a second embodiment, an apparatus can include at least one processor and at least one memory including computer program code, wherein the at least one memory and the computer program code are configured to, with the at least one processor, cause the apparatus at least to decide to multiplex the data of at least two users within a super-constellation; determine the power split ratio among the at least two users; select a super-constellation; and based on the determined power split ratio, choose a subset of the super-constellation points forming the superposition of modulation constellations of the at least two users.

According to a third embodiment, a computer program product can include a computer-readable medium bearing computer program code embodied therein for use with a computer, wherein the computer program code can include code for deciding to multiplex the data of at least two users within a super-constellation; code for determining the power split ratio among the at least two users; code for selecting a super-constellation; and code for choosing a subset of the super-constellation points forming the superposition of modulation constellations of the at least two users, based on the determined power split ratio.

According to a fourth embodiment, an apparatus can include means for deciding to multiplex the data of at least two users within a super-constellation; means for determining the power split ratio among the at least two users; means for selecting a super-constellation; and means for based on the determined power split ratio, choosing a subset of the super-constellation points forming the superposition of modulation constellations of the at least two users.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
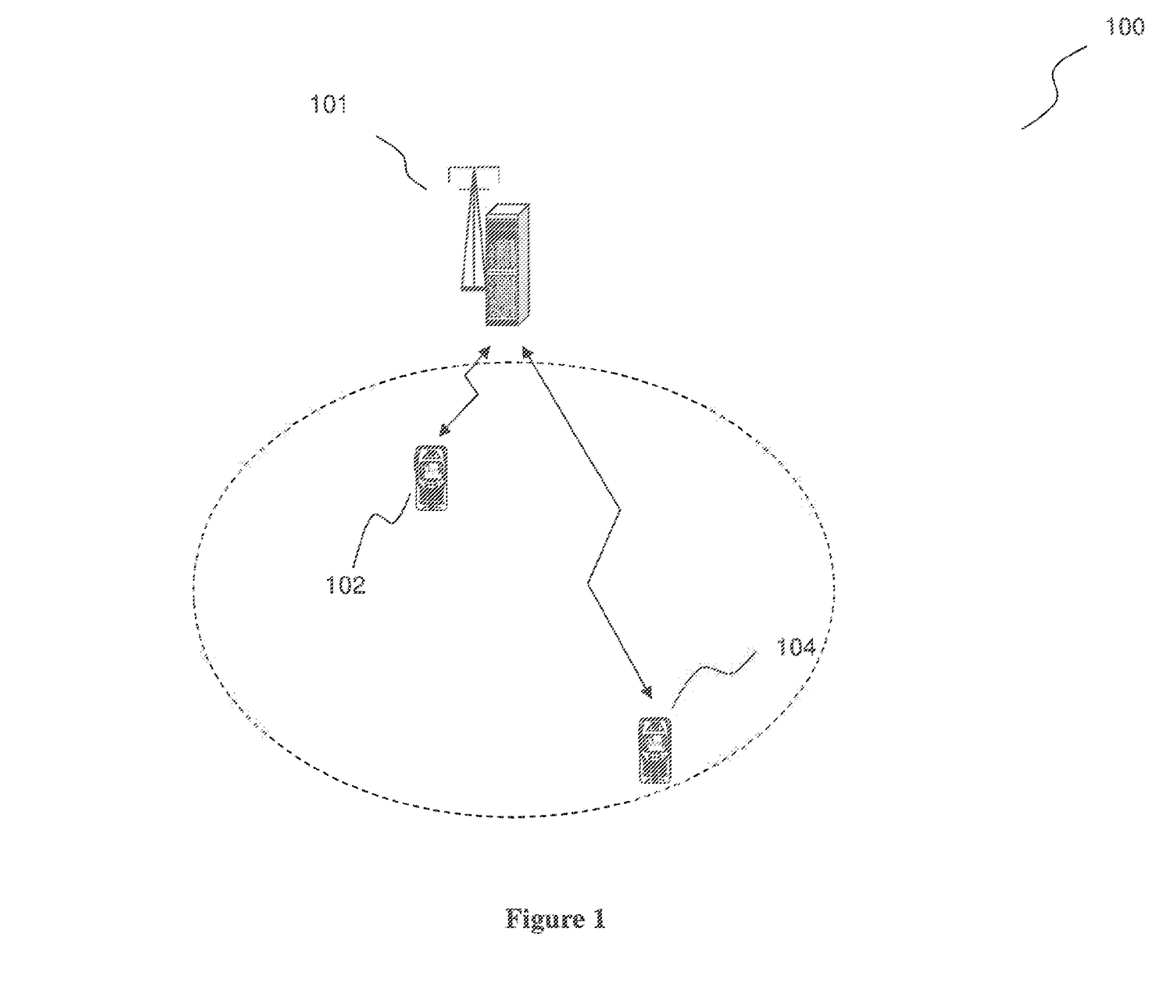
FIG. 1 illustrates an example communication system in which various example embodiments of the application implement.
Figure 2:
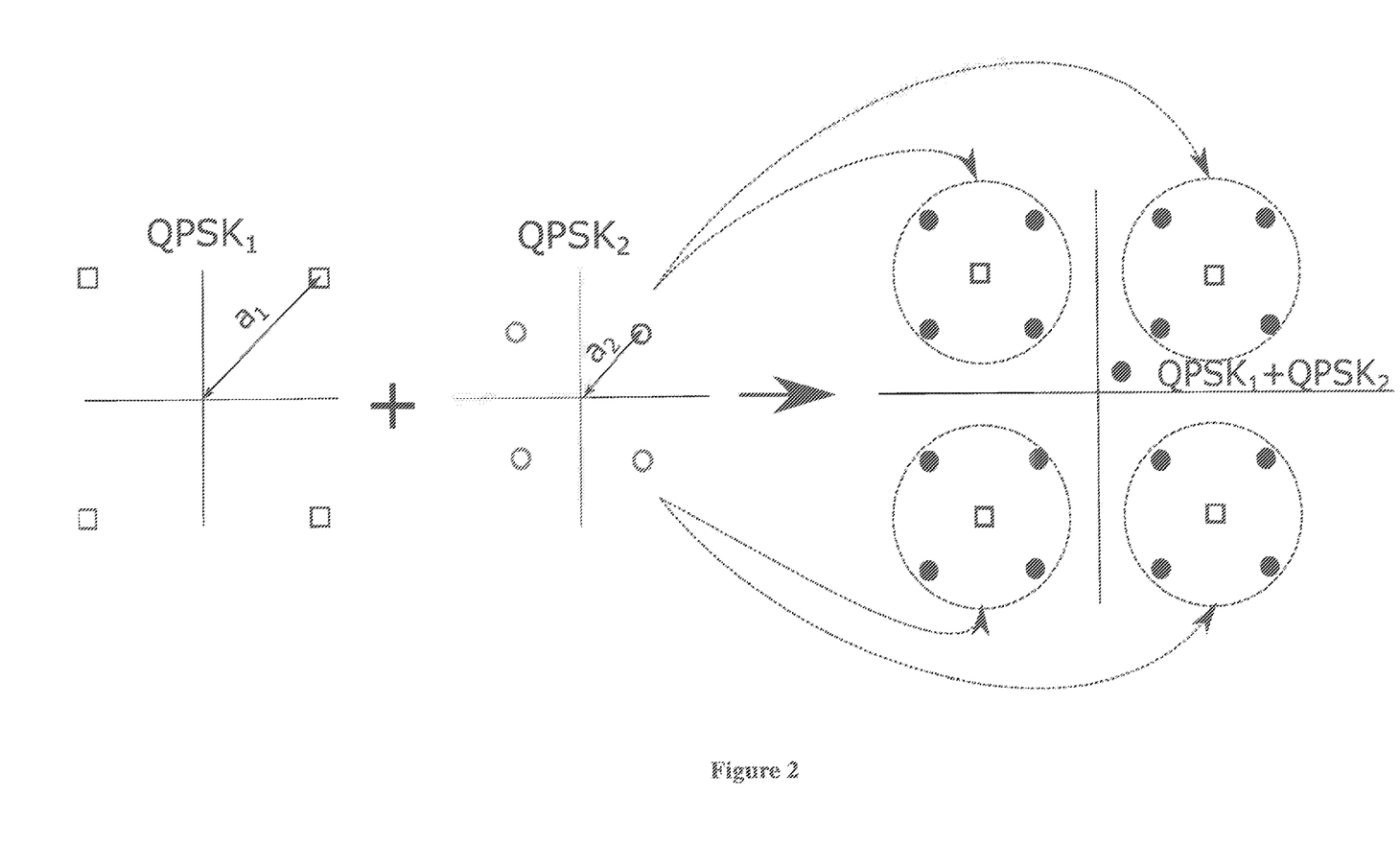
FIG. 2 illustrates an example how two QPSK constellations can construct a superposed constellation, 16QAM.

FIG. 1 illustrates an example communication system 100 in accordance with an example embodiment of the application in which the non-orthogonal multiple access (NOMA)/multi-user-superposed-transmission (MUST) technology implements. The example communication system 100 comprises a network element (NE) 101, such as for example, a $3^{rd}$ generation partnership project (3GPP) macro cell evolved NodeB (eNB) connecting to a core network that is not shown for brevity. In an example scenario, the NE 101 serves two user equipments (UEs) 102 and 104. In this example, the UE 102 may be near the NE 101 while the UE 104 is far from the NE 101. For the sake of NOMA capacity gain, it may be necessary to multiplex these two UEs in power/symbol domain on the same time/frequency resource. Although just one NE and two UEs are shown in FIG. 1, it is only for the purpose of illustration and the example communication system 100 may comprise any number of NE(s) and UE(s). FIG. 2 illustrates an example how two QPSK constellations can construct a superposed constellation, which in this case is 16QAM. Assuming that two UEs, such as for example, the UEs 102 and 104 of FIG. 1, both use QPSK constellation. The QPSK for one UE, the QPSK1 denoted by square, is scaled by $a_1$, and the QPSK for another UE, the QPSK2 denoted by circle, is scaled by $a_2$. In an example embodiment, $a_1^2 + a_2^2 = 1$. The superposed constellation QPSK1+QPSK2, i.e., the 16QAM, can be obtained by adding the scaled QPSKs together. In an example embodiment, if super-constellation has to be Gray labeled, the above step may require additional constellation flipping which can be performed by additional XNOR logical element on the input bits.

Figure 3:
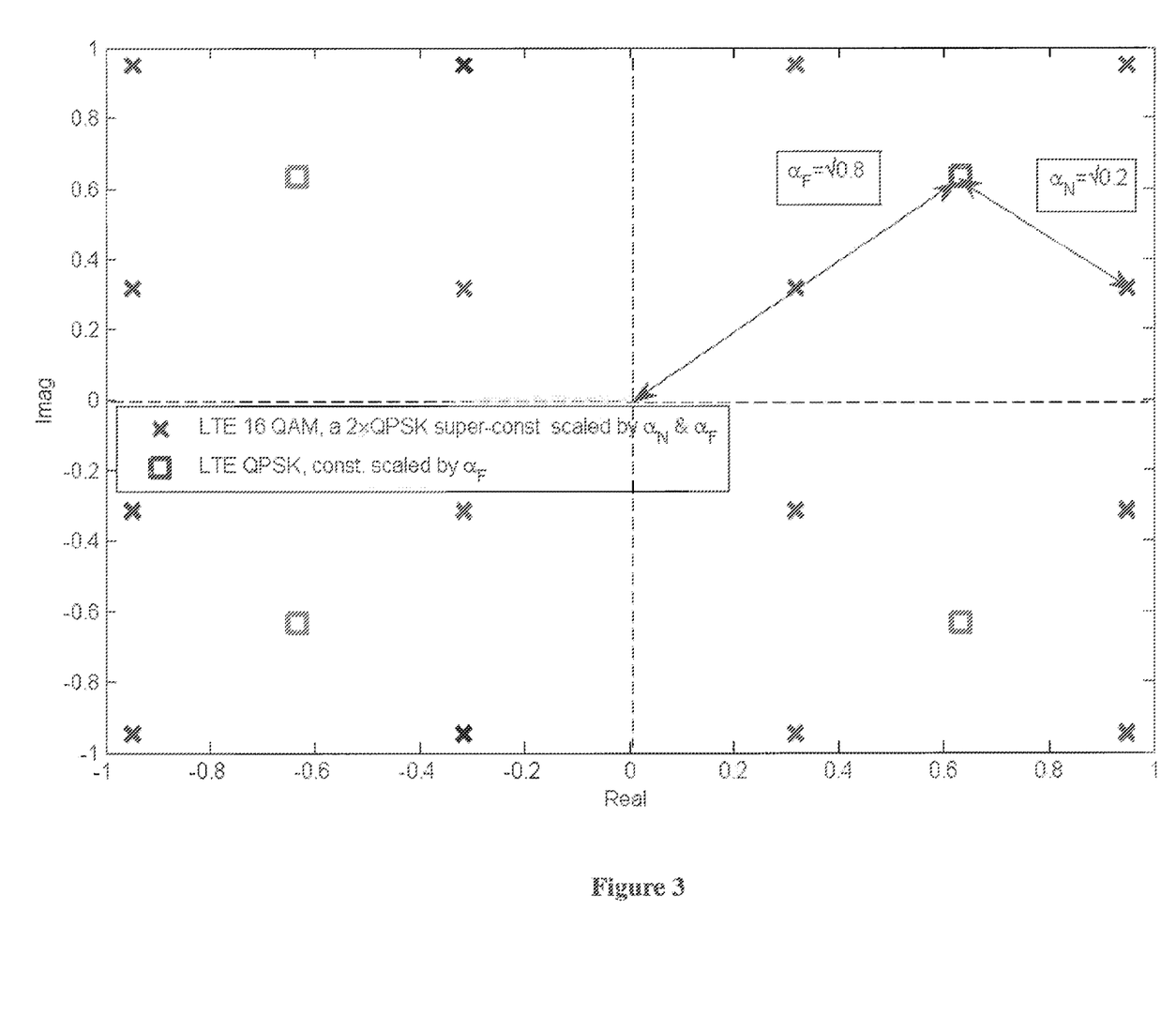
FIG. 3 illustrates another example how two QPSK constellations with power scaling of 0.8 and 0.2, respectively, can construct a superposed constellation, 16QAM.

It is noted that the existing long term evolution (LTE) constellation can be reused by separating the bits of far and near UEs. For example, the existing 16QAM constellation is a superposed constellation of two QPSK constellations with power scaling 0.8 and 0.2, respectively, as depicted in FIG. 3. Following the similar design, it turns out that the existing 16QAM, 64QAM and 256QAM can be reused for multiplexing far and near UEs as 16QAM=QPSK+QPSK, 64QAM=QPSK+16QAM, 64QAM=16QAM+QPSK, 256QAM=QPSK+64QAM, 256QAM=16QAM+16QAM, and 256QAM=64QAM+QPSK. However, the above multiplexing schemes would keep the power split between the UEs fixed for particular combination of modulation orders. For example, in the case of 16QAM=QPSK+QPSK illustrated in FIG. 3, the power split ratio is 0.8/0.2=4.

In an example embodiment, in order to increase the power scaling possibilities while reusing existing constellations, a method for bit separation is proposed, where some bits of a constellation stay unused. In another word, only a subset of the existing regular constellation points or symbols is reused. This will be demonstrated in an example of LTE 64QAM as shown in FIG. 4.

Figure 4:
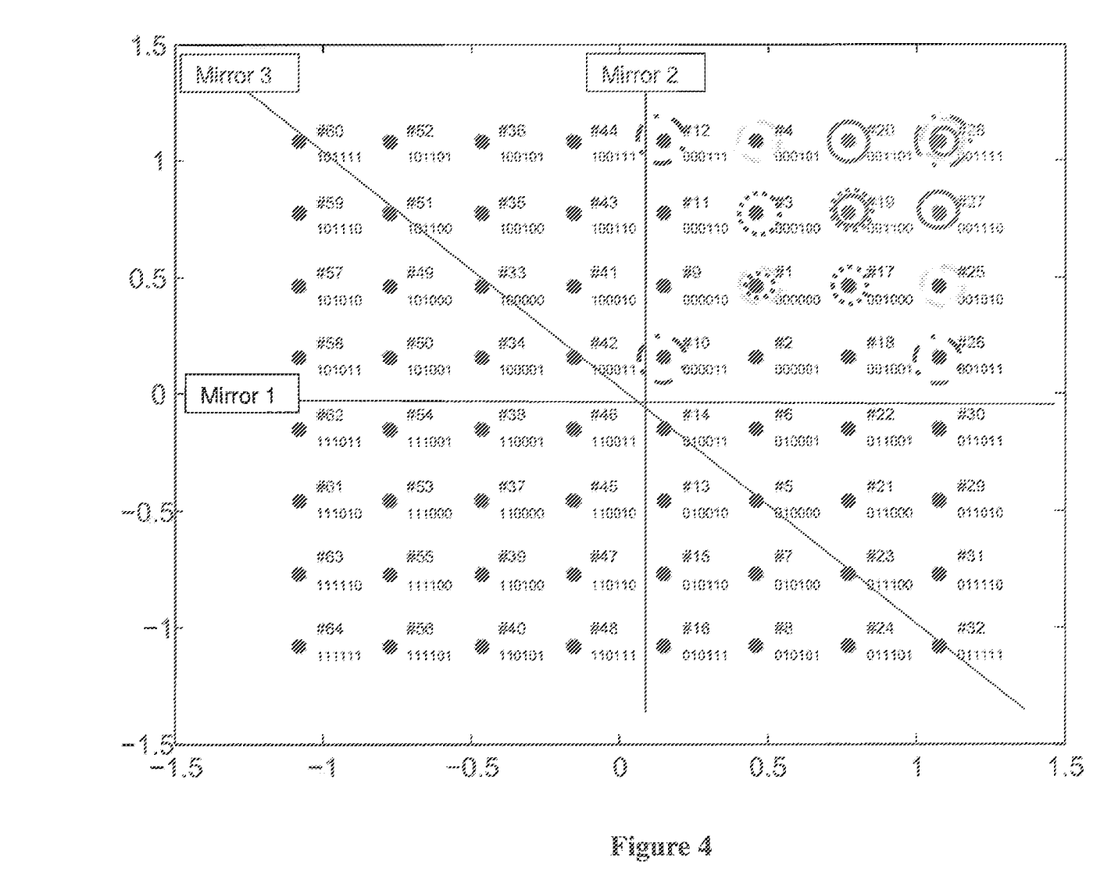
FIG. 4 illustrates the existing 64QAM that can be reused for multiplexing a far UE and a near UE in accordance with an example embodiment of the application.

FIG. 4 illustrates the existing LTE 64QAM that can be reused for multiplexing a far UE and a near UE in accordance with an example embodiment of the application. In FIG. 4, each symbol is labeled with an index for identification and corresponding bits according to 3GPP TS36.211, which is incorporated herein by reference. For example, the upper-right point #28 corresponds to bits 001111. The LTE constellations are gray-labeled, i.e. two neighbor symbols differ by a single bit. In an example embodiment, we propose to reuse only a subset of the regular-constellation points. For example, we may employ regular LTE 64QAM constellation to support superposition of two QPSK constellations. In upper right quadrant of FIG. 4 we may use different subsets of 64QAM points to form a superposed constellation, which is a 16QAM in this case. The full superposed constellation can be constructed by mirroring the points over Mirrors 1-3. In an example embodiment, there are four different subsets distinguished by line type circling the points in FIG. 4: #[19 20 27 28] circled by solid line, #[1 4 25 28] circled by dash line, #[1 3 19 17] circled by dot line, and #[10 12 26 28] circled by dash-dot line. These four subsets are listed in Table 1. In the table, the direct mapping possibility denotes that out of six bits of 64QAM, far user bits (denoted by F) and near user bits (denoted by N) can be mapped directly. For example, the bits can be mapped as FFNNxx or FFxxNN. The direct mapping does not require any extra logical processing on far and near user bit-streams when mapping to symbols. These 4 presented subsets produce useful power split ratios in addition to 0.8/0.2=4. The different power splits provide more flexibility to proportionally fair (PF) scheduler. Therefore, link capacity can be improved by means of superposition, and at the same time fairness in the system may be preserved. In case of #[1 4 25 28], the direct mapping of near UE bits is not possible, some extra logic mappings may be required. But symbols stay unchanged and such impact on standard and existing LTE baseband signal generation is minimized

TABLE 1

Examples of QPSK constellation mappings within 64QAM

| Points in a quadrant | Far UE Power | Near UE Power | Total Power | Power ratio | Direct mapping |
| --- | --- | --- | --- | --- | --- |
| #[19 20 27 28] | 1.7143 | 0.0476 | 1.7619 | 36 | YES |
| #[1 4 25 28] | 1.1905 | 0.1905 | 1.3810 | 6 | NO |
| #[1 3 19 17] | 0.7619 | 0.0476 | 0.8095 | 16 | YES |
| #[10 12 26 28] | 0.7619 | 0.4286 | 1.1905 | 2.77 | YES |

Note that, for example the total power of #[1 4 25 28] from Table 1 exceeds 1, but this offset can be solved by adding a constant offset to the existing power-offset set, currently signaled semi-statically to the UE as UE specific information. Alternatively, power pooling can be used between the sub-bands.

The extra power may be borrowed from neighboring sub-bands within orthogonal frequency division multiplexing (OFDM) symbol.

Figure 5:
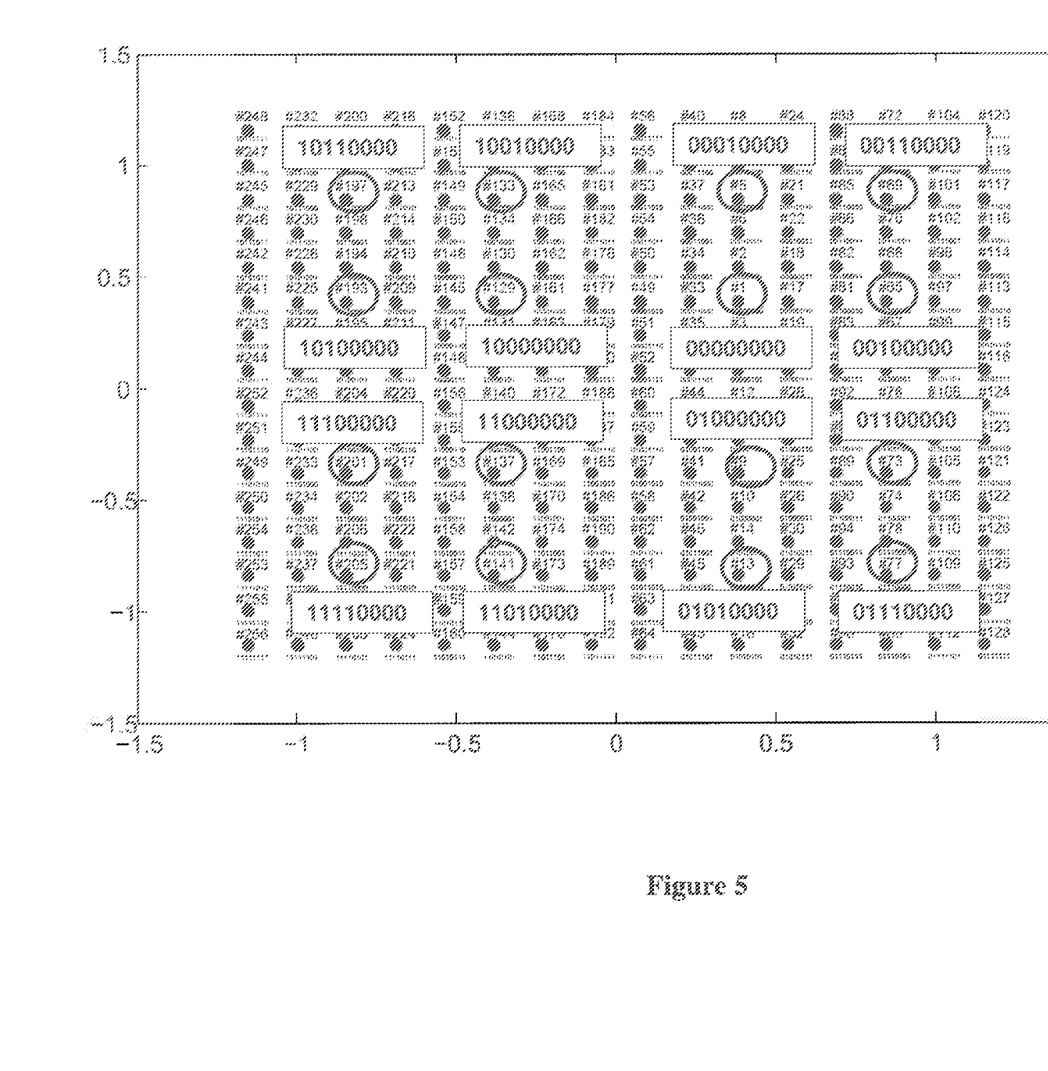
FIG. 5 illustrates the existing 256QAM that can be reused for multiplexing a far UE and a near UE in accordance with an example embodiment of the application.

In an example embodiment, in case of LTE 256QAM, there are more combinations available for QPSK+QPSK superposition. LTE 256QAM constellation and one example of subset of constellation points denoted in the upper right quadrant as #[1 5 69 65] are illustrated in FIG. 5. Table 2 lists the property of this example of QPSK constellation mapping within 256QAM, producing useful power ratio and allowing for direct mapping of bits. In an example embodiment, for #[1 5 69 65] the bits may be mapped as FFNN0000, i.e. bits 1 and 2 are dedicated to far UE, bits 3 and 4 are dedicated to near UE, and bits 5,6,7 and 8 are unused and may be fixed to 0000.

TABLE 2

Examples of QPSK constellation mappings within 256QAM

| Points in a quadrant | Far UE Power | Near UE Power | Total Power | Power ratio | Direct mapping |
| --- | --- | --- | --- | --- | --- |
| #[1 5 69 65] | 0.7529 | 0.1059 | 0.8588 | 7.11 | YES |

In an example embodiment, an indicator may be transmitted to a UE to indicate the constellation to be used for superposition of at least two constellations of lower order. In an example embodiment, a dynamic signaling may be used to indicate the particular subset of constellation as one of multiple options for superposition of at least two constellations of lower order. Alternatively, it can be blind detected out of a set of possible configuration options.

Figure 6:
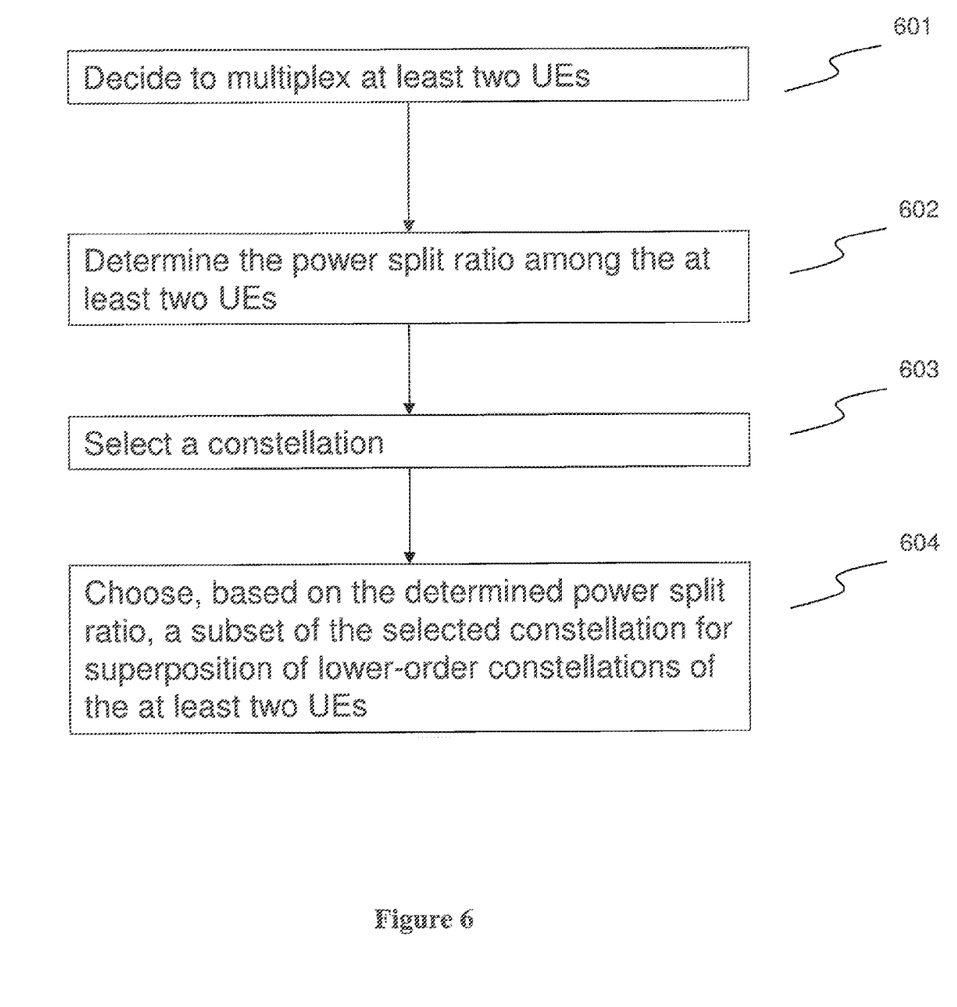
FIG. 6 illustrates a flowchart in accordance with an example embodiment of the application.

FIG. 6 illustrates a flowchart in accordance with an example embodiment of the application. In the example of FIG. 6, a network element, such as for example, the eNB 101 of FIG. 1, decides at step 601 to multiplex in power/symbol domain at least two UEs, such as for example, a near UE 102 and a far UE 104 of FIG. 1. At step 602, the NE determines the power split ratio among the at least two UEs. At step 603, the NE selects a constellation. In an example embodiment, the selected constellation is a regular spaced constellation. In an example embodiment, the selected constellation has been adopted and specified in a standard, such as LTE. Based on the determined power split ratio, the NE chooses a subset of the selected constellation for superposition of constellations of the at least two UEs at step 604. The constellations of the at least two UEs have lower orders than the constellation selected at step 603.

Figure 7:
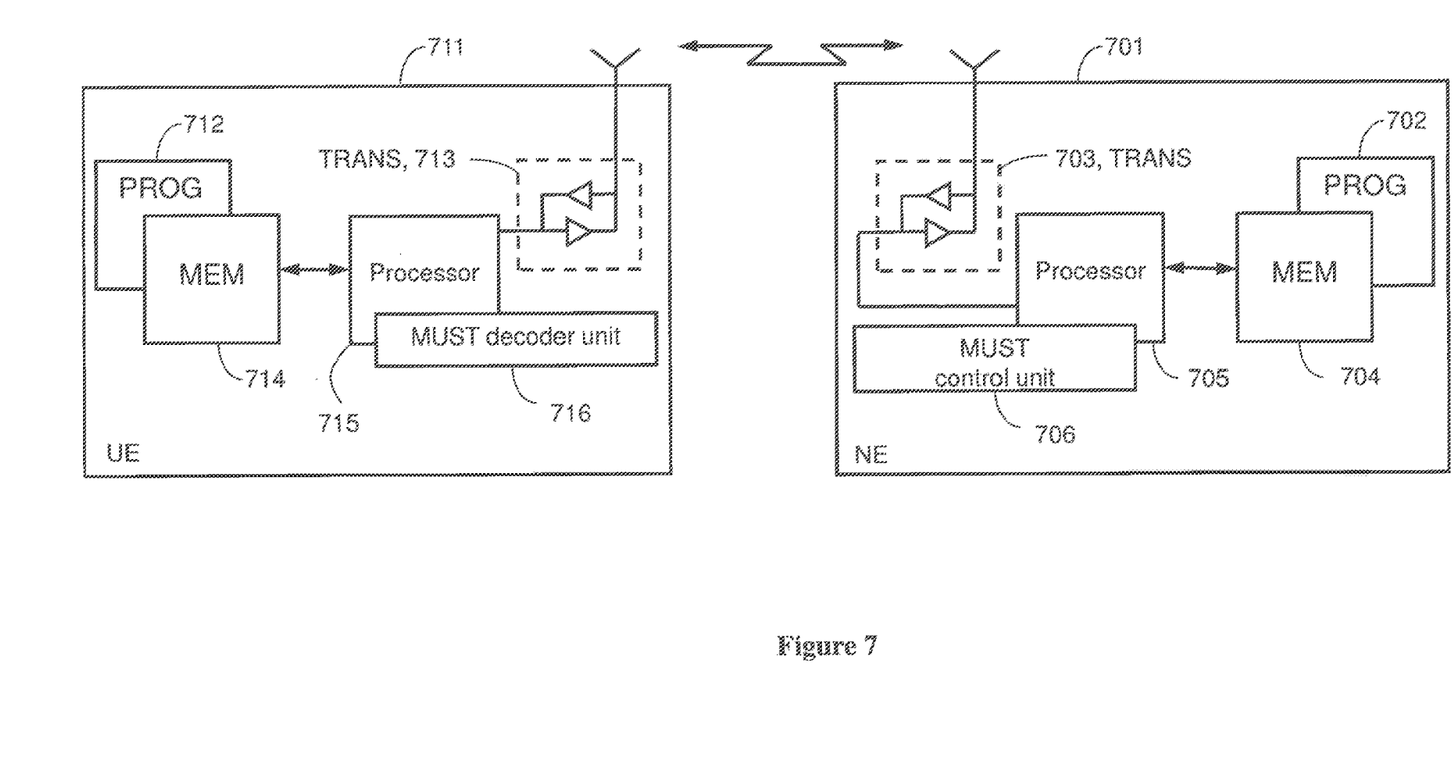
FIG. 7 illustrates a simplified block diagram of various example apparatuses that are suitable for use in practicing various example embodiments of this application.

Reference is made to FIG. 7 for illustrating a simplified block diagram of various example apparatuses that are suitable for use in practicing various example embodiments of this application. In FIG. 7, a network element, NE, 701, such as for example, the eNB 101 of FIG. 1, is adapted for communication with a UE 711, such as for example, the UE 102, or UE 104 of FIG. 1. The UE 711 includes at least one processor 715, at least one memory (MEM) 714 coupled to the at least one processor 715, and a suitable transceiver (TRANS) 713 (having a transmitter (TX) and a receiver (RX)) coupled to the at least one processor 715. The at least one MEM 714 stores a program (PROG) 712. The TRANS 713 is for bidirectional wireless communications with the NE 701.

The NE 701 includes at least one processor 705, at least one memory (MEM) 704 coupled to the at least one processor 705, and a suitable transceiver (TRANS) 703 (having a transmitter (TX) and a receiver (RX)) coupled to the at least one processor 705. The at least one MEM 704 stores a program (PROG) 702. The TRANS 703 is for bidirectional wireless communications with the UE 711. The NE 701 may be coupled to one or more cellular networks or systems, which is not shown in this figure.

As shown in FIG. 7, the NE 701 may further include a multi-user-superposed-transmission (MUST) control unit 706. The unit 706, together with the at least one processor 705 and the PROG 702, may be utilized by the NE 701 in conjunction with various example embodiments of the application, as described herein.

As shown in FIG. 7, the UE 711 may further include a MUST decoder unit 716. The unit 716, together with the at least one processor 715 and the PROG 712, may be utilized by the UE 711 in conjunction with various example embodiments of the application, as described herein.

At least one of the PROGs 702 and 712 is assumed to include program instructions that, when executed by the associated processor, enable the electronic apparatus to operate in accordance with the example embodiments of this disclosure, as discussed herein.

In general, the various example embodiments of the apparatus 711 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The example embodiments of this disclosure may be implemented by computer software or computer program code executable by one or more of the processors 705, 715 of the NE 701 and the UE 711, or by hardware, or by a combination of software and hardware.

The MEMs 704 and 714 may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The processors 705 and 715 may be of any type suitable to the local technical environment, and may include one or more of general purpose computers, special purpose computers, microprocessors, digital signal processors (DSPs) and processors based on multi-core processor architecture, as non-limiting examples.

Without in any way limiting the scope, interpretation, or application of the claims appearing below, a technical effect of one or more of the example embodiments disclosed herein may be easing the implementation of MUST, because existing constellation mapping is reused. Gray labelling may be preserved. Another technical effect may be enabling MUST with more power split ratios per given modulation combination.

Embodiments of the present invention may be implemented in software, hardware, application logic or a combination of software, hardware and application logic. The software, application logic and/or hardware may reside on an apparatus such as a user equipment, an eNB or other mobile communication devices. If desired, part of the software, application logic and/or hardware may reside on a NE 701, part of the software, application logic and/or hardware may reside on a UE 711, and part of the software, application logic and/or hardware may reside on other chipset or integrated circuit. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device.

It is also noted herein that while the above describes example embodiments of the invention, these descriptions should not be viewed in a limiting sense. Rather, there are several variations and modifications which may be made without departing from the scope of the present invention.

Further, the various names used for the described parameters are not intended to be limiting in any respect, as these parameters may be identified by any suitable names.

If desired, the different functions discussed herein may be performed in a different order and/or concurrently with each other. Furthermore, if desired, one or more of the above-described functions may be optional or may be combined. As such, the foregoing description should be considered as merely illustrative of the principles, teachings and example embodiments of this invention, and not in limitation thereof.

We claim:

1. A method, comprising:
    deciding, by an apparatus, to multiplex data of at least two users within a super-constellation;
    determining a power split ratio among the at least two users;
    selecting a super-constellation; and
    based on the determined power split ratio, choosing a subset of super-constellation points forming a super-position of modulation constellations of the at least two users, the method further comprising:
    normalizing a multiplexed signal to nominal power.

2. The method according to claim 1, wherein the sum of orders of the modulation constellations of the at least two users is lower than the modulation order of the selected super-constellation.

3. The method according to claim 1, further comprising mapping data bits of the at least two users to the super-constellation points of the chosen subset.

4. The method according to claim 3, wherein the data bits of at least one of the at least two users are Gray labeled so that each pair of mapped neighbor points differ by a single bit.

5. The method according to claim 1, further comprising indicating the chosen subset of the selected super-constellation to the at least two users.

6. The method according to claim 1, wherein the super-constellation is a uniform constellation.

7. An apparatus, comprising:
at least one processor;
and at least one memory including computer program code,
wherein the at least one memory and the computer program code are configured to, with the at least one processor, cause the apparatus at least to:
decide to multiplex data of at least two users within a super-constellation;
determine a power split ratio among the at least two users;
select a super-constellation; and
based on the determined power split ratio, choose a subset of super-constellation points forming a superposition of modulation constellations of the at least two users, wherein the at least one memory and the computer program code are configured to, with the at least one processor, cause the apparatus further to:
normalize a multiplexed signal to nominal power.

8. The apparatus according to claim 7, wherein the sum of orders of the modulation constellations of the at least two users is lower than the modulation order of the selected super-constellation.

9. The apparatus according to claim 7, wherein the at least one memory and the computer program code are configured to, with the at least one processor, cause the apparatus further to map data bits of the at least two users to the super-constellation points of the chosen subset.

10. The apparatus according to claim 9, wherein the data bits of at least one of the at least two users are Gray labeled so that each pair of mapped neighbor points differ by a single bit.

11. The apparatus according to claim 7, wherein the at least one memory and the computer program code are configured to, with the at least one processor, cause the apparatus further to indicate the chosen subset of the selected super-constellation to the at least two users.

12. The apparatus according to claim 7, wherein the super-constellation is a uniform constellation.

13. A computer program product comprising a non-transitory computer-readable medium bearing computer program code embodied therein for use with a computer, the computer program code comprising:
code for deciding to multiplex data of at least two users within a super-constellation;
code for determining a power split ratio among the at least two users;
code for selecting a super-constellation; and
code for choosing a subset of super-constellation points forming a superposition of modulation constellations of the at least two users, based on the determined power split ratio, the computer program code further comprising:
code for normalizing a multiplexed signal to nominal power.

14. The computer program product according to claim 13, wherein the sum of orders of the modulation constellations of the at least two users is lower than the modulation order of the selected super-constellation.

15. The computer program product according to claim 13, wherein the computer program code further comprising code for mapping data bits of the at least two users to the super-constellation points of the chosen subset.

16. The computer program product according to claim 15, wherein the data bits of at least one of the at least two users are Gray labeled so that each pair of mapped neighbor points differ by a single bit.

17. The computer program product according to claim 13, wherein the computer program code further comprising code for indicating the chosen subset of the selected super-constellation to the at least two users.

18. The computer program product according to claim 13, wherein the super-constellation is a uniform constellation.

* * * * *